United States Patent
Xu et al.

(10) Patent No.: US 10,945,095 B2
(45) Date of Patent: Mar. 9, 2021

(54) METHODS AND SYSTEMS FOR PROVIDING TRANSPORTATION SERVICE

(71) Applicant: BEIJING DIDI INFINITY TECHNOLOGY AND DEVELOPMENT CO., LTD., Beijing (CN)

(72) Inventors: Hailiang Xu, Beijing (CN); Weihuan Shu, Beijing (CN); Ruidong Li, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/901,452

(22) Filed: Jun. 15, 2020

(65) Prior Publication Data

US 2020/0314593 A1 Oct. 1, 2020

Related U.S. Application Data

(63) Continuation of application No. PCT/CN2019/073027, filed on Jan. 24, 2019.

(30) Foreign Application Priority Data

Dec. 15, 2017 (CN) .......................... 201711346863.4

(51) Int. Cl.
*H04W 24/00* (2009.01)
*H04W 4/02* (2018.01)
(Continued)

(52) U.S. Cl.
CPC .............. *H04W 4/025* (2013.01); *G06N 5/04* (2013.01); *G06N 20/00* (2019.01); *G06Q 50/30* (2013.01); *H04L 67/22* (2013.01)

(58) Field of Classification Search
CPC .............. G06Q 50/30; G06Q 30/0261; G06Q 30/0267; G06Q 50/01
See application file for complete search history.

(56) References Cited

U.S. PATENT DOCUMENTS 9,602,193 B1 * 3/2017 Mendelson ............ G08C 17/02
9,911,084 B2 3/2018 Bryson et al.
(Continued)

FOREIGN PATENT DOCUMENTS

CN 103347297 A 10/2013
CN 104848849 A 8/2015
(Continued)

OTHER PUBLICATIONS

International Search Report in PCT/CN2019/073027 dated Apr. 12, 2019, 4 pages.
(Continued)

*Primary Examiner* — Khalid W Shaheed
(74) *Attorney, Agent, or Firm* — Bayes PLLC (57) ABSTRACT

Methods and systems for providing transportation service to a passenger are disclosed. An exemplary method for providing transportation service may include receiving a transportation request from a terminal device, the transportation request indicating a passenger position. The method may further include causing the terminal device to search for network condition information associated with the passenger position. The method may also include determining, by at least one processor, a pick-up location for the transportation request based on the network condition information, and providing the pick-up location to the terminal device.

17 Claims, 8 Drawing Sheets

(51) Int. Cl.
*G06N 20/00* (2019.01)
*G06N 5/04* (2006.01)
*G06Q 50/30* (2012.01)
*H04L 29/08* (2006.01)

(56) References Cited

U.S. PATENT DOCUMENTS

| | | | |
|---|---|---|---|
| 9,940,654 B1* | 4/2018 | Davies | G06Q 30/0619 |
| 2011/0030037 A1* | 2/2011 | Olshansky | H04L 63/10 |
| | | | 726/4 |
| 2016/0307119 A1 | 10/2016 | Yehuda et al. | |
| 2018/0224853 A1* | 8/2018 | Izhikevich | G05D 1/0274 |
| 2018/0341274 A1* | 11/2018 | Donnelly | H04W 4/46 |
| 2018/0376305 A1* | 12/2018 | Ramalho de Oliveira | |
| | | | G08G 1/096775 |
| 2019/0086507 A1 | 3/2019 | Zhao | |

FOREIGN PATENT DOCUMENTS

| | | |
|---|---|---|
| CN | 105187484 A | 12/2015 |
| CN | 105677793 A | 6/2016 |
| CN | 106489514 A | 3/2017 |
| CN | 106779141 A | 5/2017 |
| CN | 106921938 A | 7/2017 |
| CN | 108537350 A | 9/2018 |
| WO | 2016008390 A1 | 1/2016 |
| WO | 2017172415 A1 | 10/2017 |

OTHER PUBLICATIONS

Written Opinion in PCT/CN2019/073027 dated Apr. 12, 2019, 4 pages.
First Office Action in Chinese Application No. 201711346863.4 dated Mar. 20, 2020, 14 pages.
The Extended European Search Report in European Application No. 19730244.1 dated Aug. 14, 2020, 8 pages.
International Search Report in PCT/CN2019/074903 dated Oct. 30, 2019, 4 pages.
Written Opinion in PCT/CN2019/074903 dated Oct. 30, 2019, 4 pages.
The Second Office Action issued in corresponding Chinese Application No. 201711346863.4, dated Sep. 28, 2020, 14 pages.

* cited by examiner

METHODS AND SYSTEMS FOR PROVIDING TRANSPORTATION SERVICE

CROSS REFERENCE TO RELATED APPLICATION

The present application is a Continuation of International Application No. PCT/CN2019/073027, filed on Jan. 24, 2019, which is based on and claims the benefits of priority to Chinese Application No. 201711346863.4, filed Dec. 15, 2017, the entire contents of which are incorporated herein by reference.

TECHNICAL FIELD

The present disclosure relates to providing transportation services, and more particularly, to methods and systems for automatically determining a pick-up location for a passenger upon a transportation service request.

BACKGROUND

An online hailing platform (e.g., DiDi™ online) can receive a rideshare service request from a passenger and then route the service request to at least one transportation service provider (e.g., a taxi driver, a private car owner, or the like). The service request can be answered by a service provider, or assigned to a service provider if no one picks up the service request within a predetermined period.

The service provider matched for the transportation service provider typically waits where the passenger is to be picked up. For example, a passenger might request service from a hotel, and she will wait at the front entrance of the hotel for the service vehicle to pick her up. However, due to traffic conditions, having the provider pick up the passenger at the passenger position may not always be the most efficient approach. For example, if there is an accident near the hotel, it may take the vehicle 30 minutes or longer to navigate through the traffic and get to the hotel. As another example, if the passenger is inside a building when she makes the request, the service vehicle will not be able to pick up the passenger from inside of the building.

Embodiments of the present disclosure provide methods and systems that address the aforementioned shortcomings.

SUMMARY

Embodiments of the disclosure provide an exemplary method for providing transportation service to a passenger. The method may include receiving a transportation request from a terminal device, the transportation request indicating a passenger position. The method may further include causing the terminal device to search for network condition information associated with the passenger position. The method may also include determining, by at least one processor, a pick-up location for the transportation request based on the network condition information, and providing the pick-up location to the terminal device.

Embodiments of the disclosure further disclose a system for providing transportation service to a passenger. The system may include a communication interface, at least one memory, and at least one processor coupled to the communication interface and the at least one memory. The communication interface may be configured to receive a transportation request from a terminal device. The transportation request indicates a passenger position. The communication interface may be further configured to cause the terminal device to search for network condition information associated with the passenger position. The at least one processor may be configured to determine a pick-up location for the transportation request based on the network condition information, and provide the pick-up location to the terminal device.

Embodiments of the disclosure further disclose a non-transitory computer-readable medium. The non-transitory computer-readable medium may store a set of instructions, when executed by at least one processor of an electronic device, cause the electronic device to perform a method for providing transport service to a passenger. The method may include receiving a transportation request from a terminal device, the transportation request indicating a passenger position. The method may further include causing the terminal device to search for network condition information associated with the passenger position. The method may also include determining a pick-up location for the transportation request based on the network condition information, and providing the pick-up location to the terminal device.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An aspect of the disclosure is directed to a system for providing transportation service information. In some embodiments, the system may be configured to receive a transportation service request from a terminal device (e.g., a mobile phone, a wearable device, or the like). The transportation service indicates the passenger's position. In some embodiments, the passenger position may be obtained automatically by a positioning device, e.g., a Global Positioning System (GPS) receiver used by the terminal device. In some embodiments, the passenger position may be provided manually by the passenger when making the request.

The terminal device may be configured to search for networks near the passenger position and obtain network condition information. In some embodiments, the network condition information may include one or more network identifications, e.g., Wi-Fi identifications, and their respective network signal strengths. In some other embodiments, the network condition information obtained may include one or more Wi-Fi access points. The system may be configured to determine a pick-up location for the transportation request based on the network condition information. The pick-up location may be determined according to various embodiments. In some embodiments, historical transportation service requests associated with similar network conditions may be considered. The pick-up locations used in those historical transportation service requests may be used to determine the pick-up location for the current request. For example, when several historical transportation service requests are identified as relevant, they may be ranked, and their respective pick-up locations may be recommended to the passenger in the order of the ranking. In some other embodiments, additional criteria may be used such as whether the terminal device is connected to the network, the strength of the network signal, the relative direction of destination, etc. The system may provide the pick-up location to the terminal device. In some embodiments, the system or the terminal device may provide a navigate route to the passenger to the pick-up location.

Figure 1:
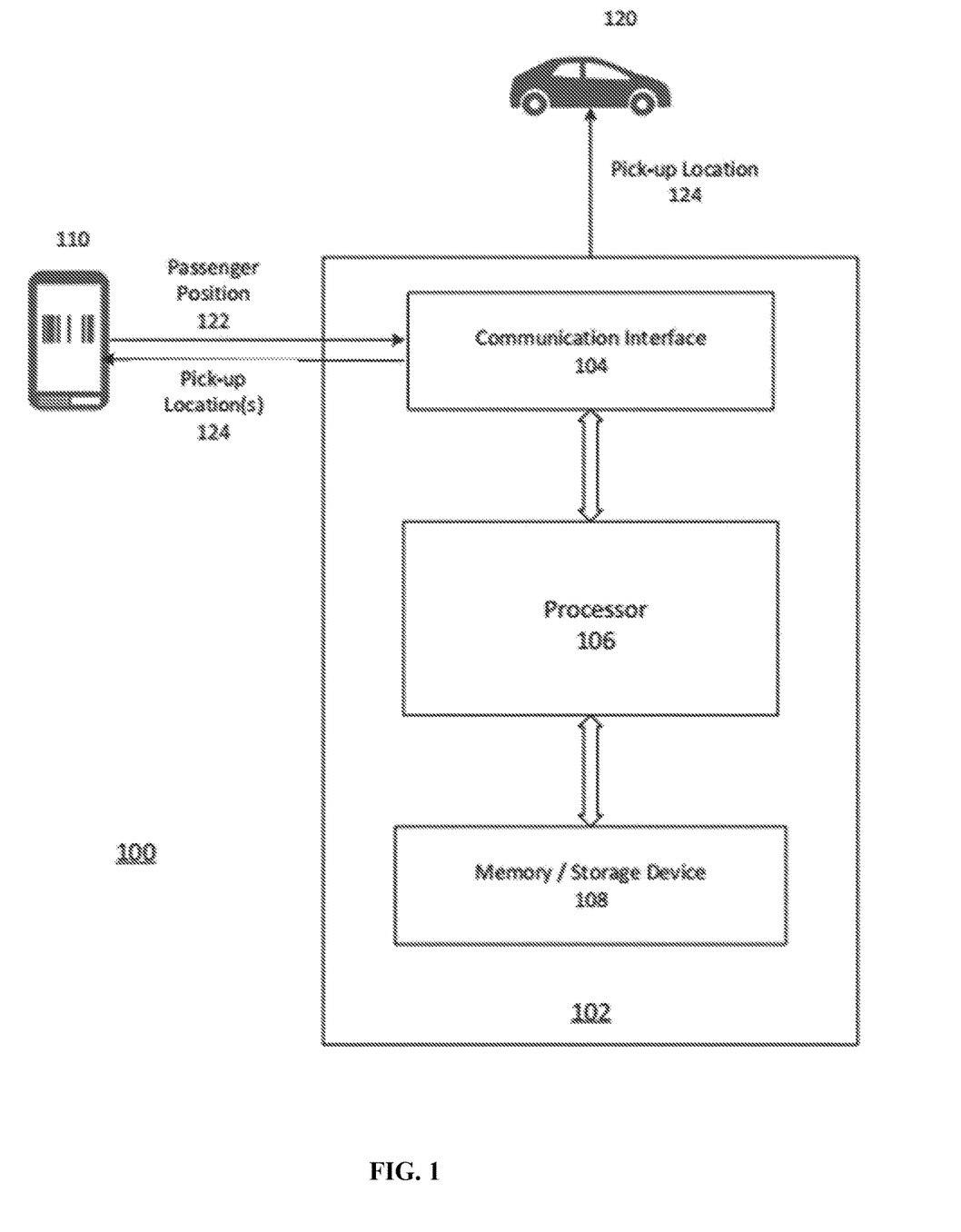
FIG. 1 illustrates a schematic diagram of an exemplary system for providing transportation service, according to embodiments of the disclosure.

FIG. 1 illustrates a schematic diagram of an exemplary system 100 for providing transportation service, according to embodiments of the disclosure. System 100 may include a transportation service management server 102 (also referred to as server 102 for simplicity). Server 102 can be a general-purpose server or a proprietary device specially designed for providing transportation service. It is contemplated that, server 102 can be a stand-alone system (e.g., a server) or an integrated component of a stand-alone server. Because processing transportation service may require significant computation resources, in some embodiments, server 102 may be preferably implemented as a stand-alone system. In some embodiments, server 160 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 102 may be located in a cloud, or may be alternatively in a single location (such as inside a terminal device 110) or distributed locations. Components of server 102 may be in an integrated device, or distributed at different locations but communicate with each other through a network (not shown).

In some embodiments, as shown in FIG. 1, server 102 may include a communication interface 104, a processor 106, and a memory/storage device 108. Although FIG. 1 shows communication interface 104, processor 106, and memory/storage device 108 all within one server 102, it is contemplated that these components may be distributed among multiple devices located near to or remotely with respect to each other. In some embodiments, server 102 may be implemented in the cloud, or on a separate computer/server.

Communication interface 104 can be an integrated services digital network (ISDN) card, cable modem, satellite modem, or a modem to provide a data communication connection. As another example, communication interface 104 can be a local area network (LAN) card to provide a data communication connection to a compatible LAN. Wireless links can also be implemented by communication interface 104. In such an implementation, communication interface 104 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 104 may be configured to receive a transportation service request from terminal device 110. Terminal device 110 may include any suitable device that can interact with a user, e.g., a smart phone, a tablet, a wearable device, a computer, or the like. Transportation service request may include a current location of the passenger (passenger position 122), a destination of the requested transportation service, a request time, or the like. Generally, passenger position 122 can be the same or substantially close to a location of the terminal device 110. However, it is contemplated that, passenger position 122 can also differ from the location of the terminal device 110, even if the transportation service request is sent from terminal device 110. For example, a user can request a transportation service from a computer for her friend, who is distant from this user. In that case, the user may manually provide passenger position 122 on terminal device 110.

In some embodiments, terminal device 110 may be configured to search for available networks nearby and obtain network condition information. For example, terminal device 110 may search communication networks, such as 3G, 4G, LTE, etc., provided by nearby base stations. As another example, the Wi-Fi search function of terminal device 110 may be activated to search available Wi-Fi signals. In some embodiments, network condition information may include network identifications, such as different Wi-Fi connections or hotspots, and the signal strength of each connection. In some embodiments, terminal device 110 may search for nearby Wi-Fi access points.

In some embodiments, the transportation service request may indicate that it has been accepted by or otherwise matched with a service vehicle 120. Service vehicle 120 will therefore pick up the passenger and provide transportation service to her. Consistent with the present disclosure, server 102 may be configured to determine a suitable pick-up location for service vehicle 120 to pick up the passenger.

Communication interface 104 may be configured to receive vehicle information from service vehicle 120. Service vehicles 120 may include taxi cars or private cars enrolled with an online hailing platform. In some embodiments, service vehicles 120 may also include autonomous vehicles. Vehicle information provided in this manner may include vehicle position 126, capacities, current driving directions, vehicle makers and models, as well as other features or characteristics associated with service vehicle 120. In some embodiments, service vehicle 120 may be associated with terminal devices such as navigation devices onboard vehicle 120 or mobile devices used by their drivers (e.g., smart phones, tablets, wearable devices, computers, or the like). These terminal devices may communicate with server 102 and provide vehicle position 126 to server 102 via communication interface 104.

In some embodiments, communication interface 104 may be configured to receive other data such as historical transportation service requests and associated request and trajectory data such as pick-up locations, and historical records about these pick-up locations being used, etc. In some embodiments, the network condition information and historical request data may be used by server 102 to determine and recommend a pick-up location for the current transportation service request.

Processor 106 may include any appropriate type of general-purpose or special-purpose microprocessor, digital signal processor, or microcontroller. Processor 106 may be configured as a separate processor module dedicated to providing transportation service. Alternatively, processor 106 may be configured as a shared processor module for performing other functions unrelated to providing transportation service. Processor 106 may include one or more hardware units (e.g., portions of an integrated circuit) designed for use with other components or to execute a part of a program. The program may be stored on a computer-readable medium, and when executed by processor 106, it may perform one or more functions.

In some embodiments, processor 106 may be configured to determine pick-up locations for vehicle 120 to pick up the passenger. For example, processor 106 may determine that vehicle 120 should be directed to pick up the passenger at a location other than passenger position 122. In some embodiments, the pick-up locations may be determined based on various factors, including but not limited to, network condition information obtained by terminal device 110, historical transportation requests having similar network conditions, and their respective trajectories. The determined pick-up location 124 may be provided to terminal device 110 and vehicle 120. In some embodiments, processor 106 may recommend more than one pick-up location 124 to terminal device 110 to solicit user input regarding her choice of pick-up location. Upon receiving from terminal device 110 a selected pick-up location, processor 106 may be configured to provide navigate routes to terminal device 110 and vehicle 120 to guide them to the selected pick-up location.

Memory/storage device 108 may include any appropriate type of mass storage provided to store any type of information that processor 106 may need to operate. Memory/storage device 108 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory/storage device 108 may be configured to store one or more computer programs that may be executed by processor 106 to manage and coordinate transportation service disclosed herein. For example, memory/storage device 108 may be configured to store program(s) that may be executed by processor 106 to determine suitable pick-up locations for the passenger.

Memory/storage device 108 may be further configured to store information and data used by processor 106. For instance, memory/storage device 108 may be configured to store the various types of data (e.g., transportation service request, vehicle information, etc.) received by communication interface 104. Memory/storage device 108 may also store intermediate data such as pick-up locations, historical transportation service request data, network condition information, etc. The various types of data may be stored permanently, removed periodically, or disregarded immediately after each frame of data is processed.

Figure 2:
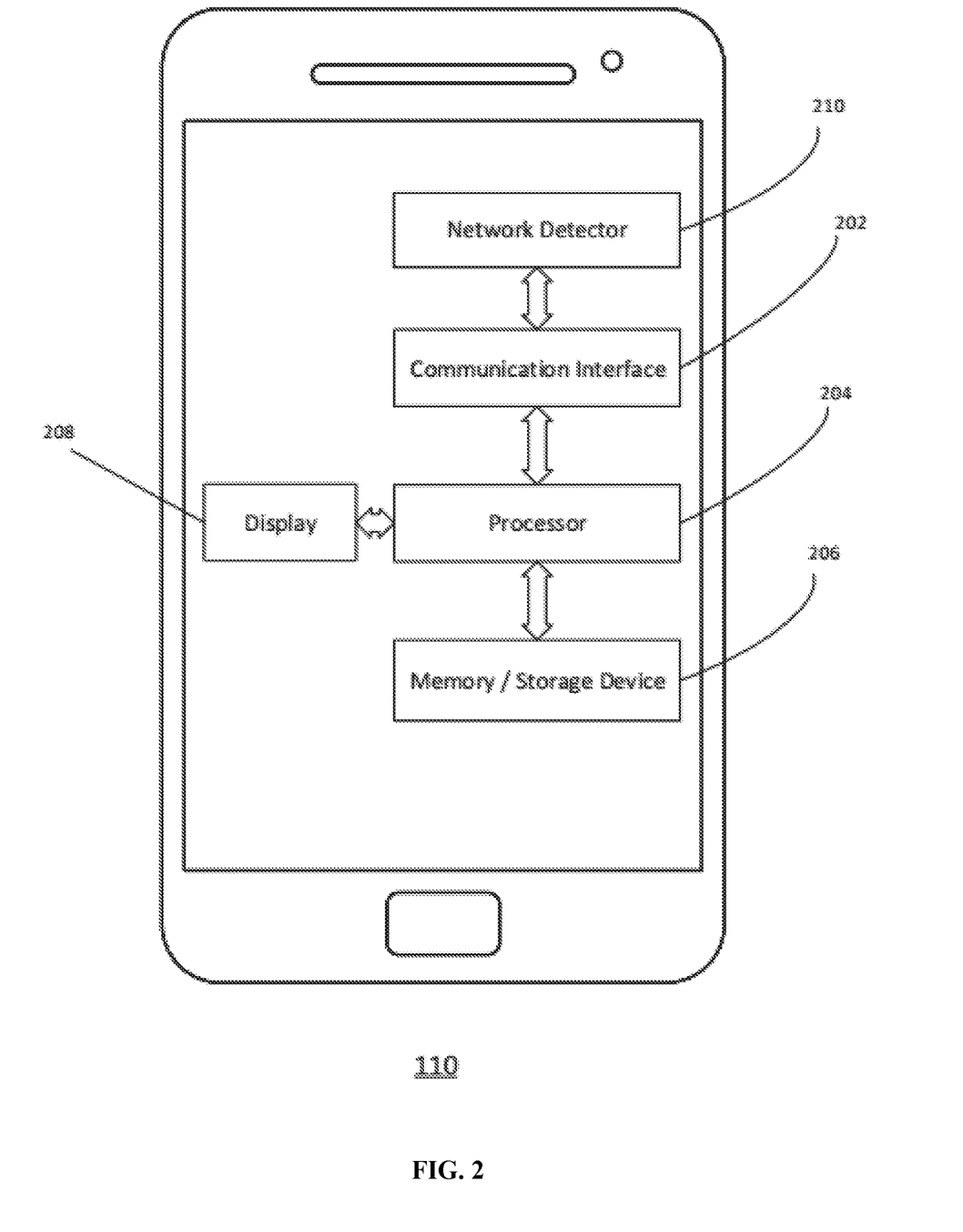
FIG. 2 illustrates a block diagram of an exemplary terminal device, according to embodiments of the disclosure.

FIG. 2 is a block diagram depicting an exemplary terminal device 110. Terminal device 110 may include a communication interface 202, a processor 204, a memory/storage device 206, a display 208, and a network detector 210. Communication interface 202 may be configured in a manner similar to communication interface 104. Communication interface 202 may facilitate communications between terminal device 110 and server 102. Processor 204 may have similar hardware structures as processor 106. For example, processor 204 may include one or more hardware units (e.g., portions of an integrated circuit) designed for use with other components or to execute a part of a program. The program may be stored on a computer-readable medium (e.g., memory/storage device 206), and when executed by processor 204, it may perform one or more functions. Memory/storage device 206 may also have similar structures as memory/storage device 108.

Display 208 may include a display such as a Liquid Crystal Display (LCD), a Light Emitting Diode Display (LED), a plasma display, or any other type of display, and provide a Graphical User Interface (GUI) presented on the display for user input and data display. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™.

Network detector 210 may be configured to search for nearby networks and obtain network condition information. In some embodiments, network detector 210 may include transceivers for transmit and receive signals, and/or processing units installed with software applications designed to search for network connections. For example, when terminal device 110 is in an open area, network detector 210 may inquire nearby base stations of carriers and receive cellular communication signals. As another example, when terminal device 110 is inside an architecture, such as a building, an underground facility, or otherwise covered space, network detector 210 may inquire available wireless access points (APs) or hotspots and receive Wi-Fi connection signals. An AP is a networking device that allows a Wi-Fi device to connect to a wired network. The AP usually connects to a router as a standalone device, but may also be an integral component of the router itself. Hotspot is a physical location where Wi-Fi access to a wireless local area network (WLAN) is available.

In some embodiments, network detector 210 may obtain network identifications, such as a 3G network provided by Verizon™ or a 4G network provided by T-Mobile™, or a Wi-Fi connection with a particular name (e.g., Marriot-™_Guest, Starbucks™_freewifi, Airport Access, Johnson's House, etc.) Network detector 210 may additionally detect the signal strength of each network/connection. For example, network A may have signal strength 3, network B may have signal strength 5, and network C may have signal strength 4. The network identifications and strengths, collectively, become the network environment of terminal device 110, indicative the network condition of terminal device 110.

In some embodiments, communication interface 202 may be configured to receive a transportation service request from a user of terminal device 110, who may or may not be the passenger. The transportation service request may include passenger position 122. In some embodiments, passenger position 122 may be captured by positioning device such as a GPS receiver built into terminal device 110. In some embodiments, communication interface 202 may provide the transportation service request including passenger position 122 to server 102. Communication interface 202 may then receive one or more pick-up locations 124 from server 102 and provide them to terminal device 110. When multiple pick-up locations are received, they may be presented as options to the user on display 208, and the user may select a pick-up location. Communication interface 202 may provide the selected pick-up location to server 102. In some embodiments, communication interface 202 may further receive a navigation route from server 102 to navigate the passenger to the pick-up location.

In some embodiments, processor 204 may determine the navigation route based on pick-up location 124. Processor 204 may also perform some of the functions described above for processor 106. For example, processor 204 may be configured to perform one or more steps of determining the pick-up location.

Figure 3:
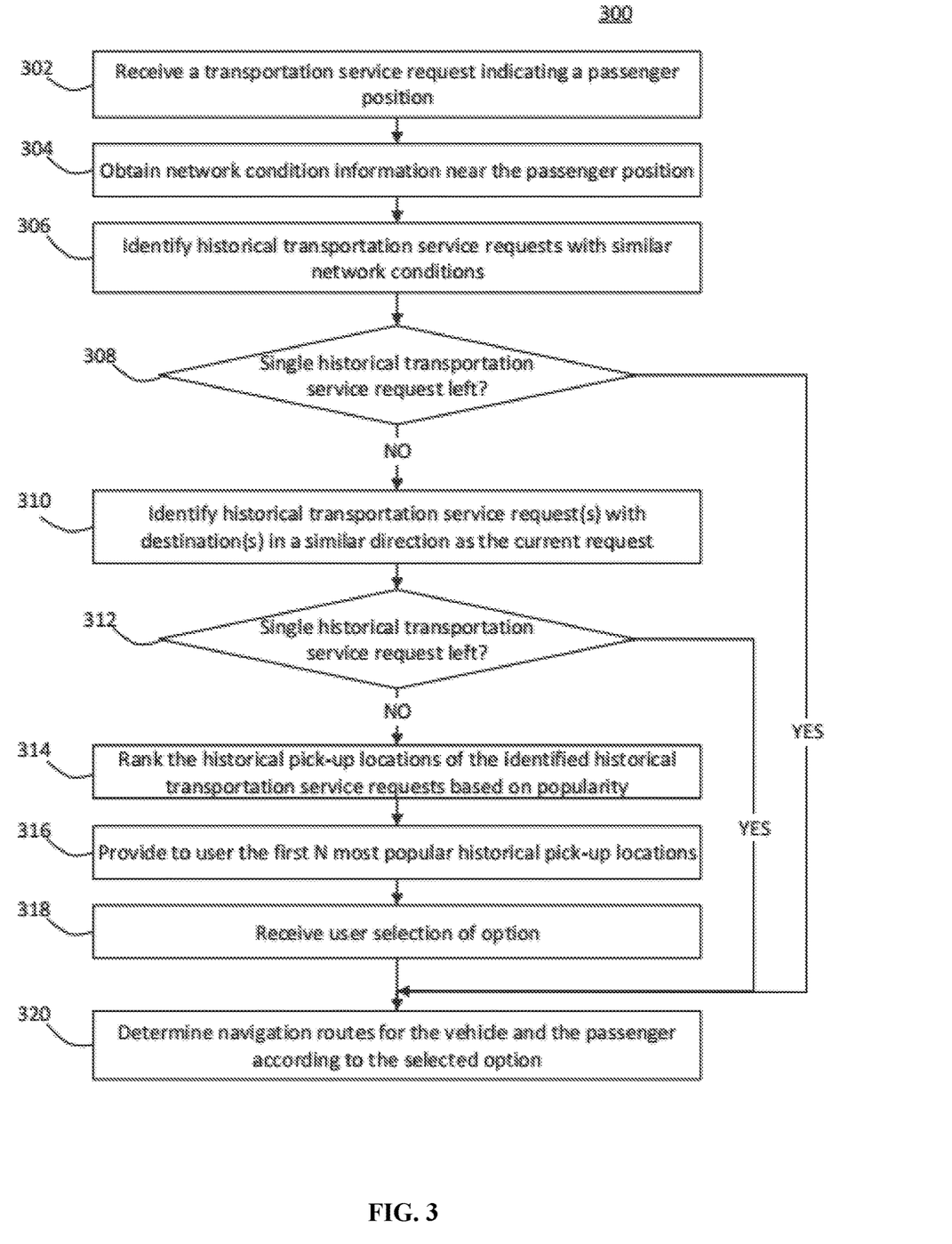
FIG. 3 illustrates a flowchart of an exemplary method for determining a pick-up location based on network condition information, according to embodiments of the disclosure.

FIG. 3 illustrates a flowchart of an exemplary method for determining a pick-up location based on network condition information, according to embodiments of the disclosure. Method 300 may be implemented by server 102 and/or terminal device 110, each including at least one processor. In the description below, server 102 is used as an example for implementing method 300. It is contemplated that method 300 can also be implemented by terminal device 110, or jointly by server 102 and terminal device 110. Consistent with the present disclosure, method 300 determines pick-up options for a transportation service request. Method 300 may include several steps as described below, some of which may be optional.

In step 302, server 102 may receive a transportation service request from terminal device 110. For example, the transportation service request may be entered by a user on terminal device 110. The transportation service request may indicate passenger position 122. Passenger position 122 may be the position of terminal device 110 as captured by a positioning device embedded therein, or a position provided by the user.

In step 304, server 102 may cause terminal device 110 to search for networks near passenger position 122, and obtain network condition information indicative of the network environment terminal device 110 is in. In some embodiments, network detector 210 may search for telecommunication base stations, Wi-Fi APs or hotspots. The network condition information obtained may include network identifications and associated signal strengths. For example, network A may have signal strength 3, network B may have signal strength 5, and network C may have signal strength 4.

In step 306, server 102 may identify historical transportation service requests with similar network conditions as the obtained network condition. Historical transportation service requests are previous requests that have been fulfilled. Accordingly, each historical transportation service request may be associated with a passenger ID, an origin, a destination, a request time, a pick-up time, a pick-up location, a trip route, a trip length, a drop-off time, and drop-off location, etc. In some embodiments, each historical transportation service request may be additionally associated with a network condition at the time the request was made. For example, the terminal device may obtain the network condition when a request was entered by a user. Server 102 may compare the network condition of each historical transportation service request with the network condition obtained in step 304, and identify the ones that have sufficiently similar network conditions. For example, the identified historical transportation service requests may also be associated with a network environment with networks A, B, and C, and their respective signal strengths close to 3, 5, and 4. If a historical transportation service request is associated with a network condition similar to that of the current request, it can be assumed that the initial position of the passenger (when she made the historical request) is close to passenger position 122 of the current request.

In step 308, server 102 may determine if a signal historical transportation service request or more than one request is identified in step 306. If only a signal historical request is found to have the similar network condition, method 300 may proceed to step 320. Otherwise, method will proceed to step 310, where historical transportation service requests with destinations in a similar direction as the current request. For example, the destination in the current request may be in the northeast of passenger position 122. Accordingly, server 102 may identify historical requests in which the respective destinations are also in the northeast of the passenger initial positions. Historical requests with destinations in the southwest of the passenger positions may be removed from the pool being considered by server 102.

In step 312, server 102 may again determine if a signal historical transportation service request or more than one request is identified in step 306. If only a signal historical request is found to have the similar network condition, method 300 may proceed to step 320. Otherwise, method will proceed to step 314, where the historical pick-up locations used by the remaining historical transportation service requests are ranked. In some embodiments, the ranking may be based on popularity of the historical pick-up locations. For example, a number of historical requests that use each historical pick-up location may be calculated. In one example, 30 historical requests remain, where 15 used position X as the pick-up location, 10 used position Y as the pick-up location, and 5 used position Z as the pick-up location. Accordingly, the historical pick-up locations may be ranked in the order of position X, position Y, and position Z.

In step 316, the first N most popular pick-up locations may be provided to terminal device 110. In some embodiments, N may be 1, i.e., the most popular historical pick-up location becomes pick-up location 124 that will be provided to terminal device 110 (step 316). In some embodiments, N may be a number greater than 1, and accordingly, in step 316, multiple pick-up locations may be provided to terminal device 110 as options for the user to choose. In some embodiments, the pick-up locations may be presented to the user in the order consistent with the rank determined in step 314. Terminal device 110 may display the option(s) on display 208 to the user. When there is a single option, the user may be asked to confirm she will accept the option. When multiple options are available, the user may be asked to select one pick-up location among the options presented.

In step 318, server 102 may receive the selected pick-up location from terminal device 110. In step 320, either server 102 or terminal device 110 may determine a driving navigation route for the vehicle and a pedestrian navigation route for the passenger. The navigation routes may be provided to vehicle 120 and terminal device 110 to be displayed on their displays, respectively. The routes can guide the driver of the vehicle and the passenger to pick-up location 124.

Figure 4:
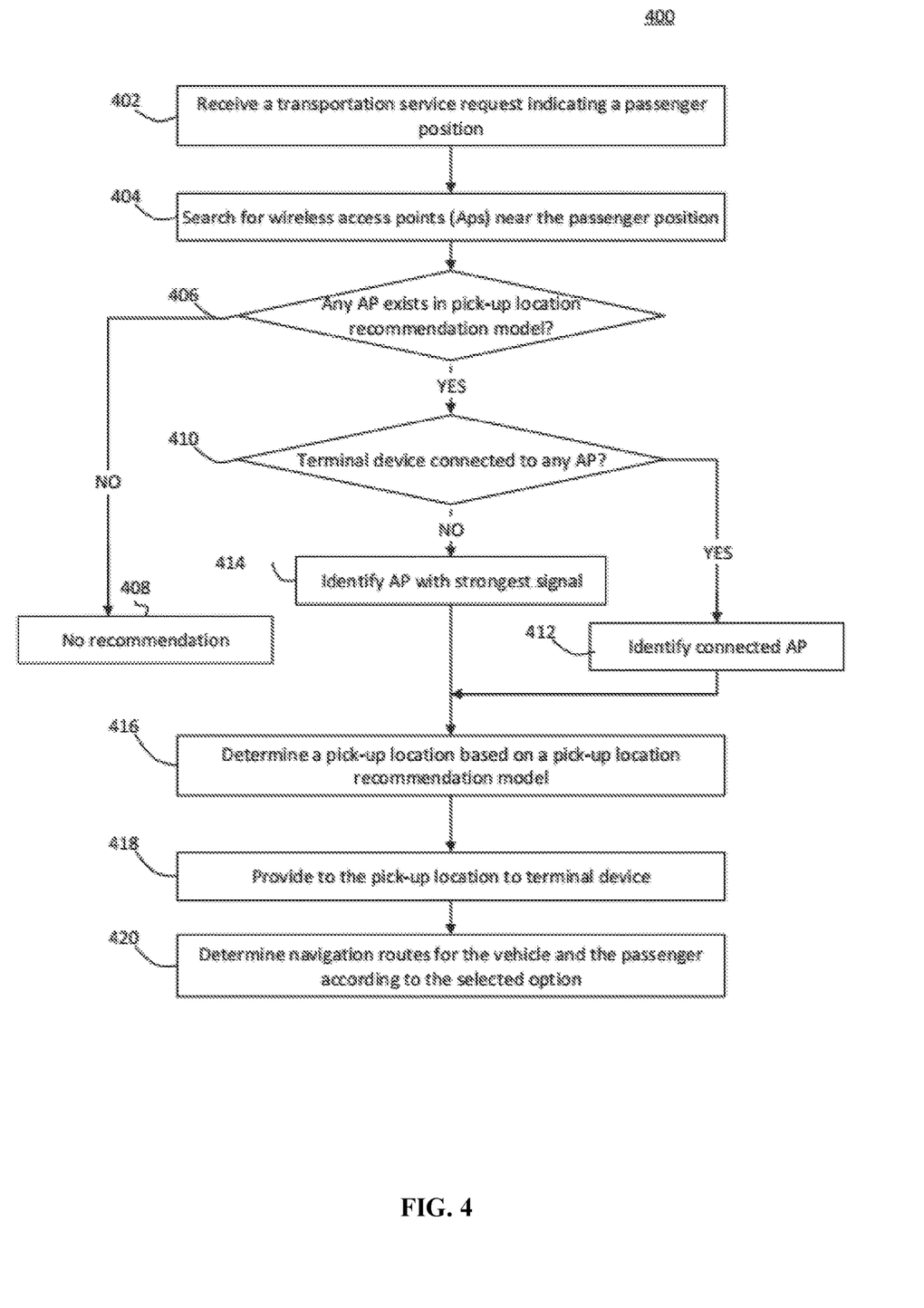
FIG. 4 illustrates a flowchart of an exemplary method for determining a pick-up location based on detected wireless access points (APs), according to embodiments of the disclosure.

FIG. 4 illustrates a flowchart of an exemplary method 400 for determining a pick-up location based on detected wireless access points (APs), according to embodiments of the disclosure. In some embodiments, method 400 may be performed when terminal device 110 is inside an architecture, e.g., a building upon receiving the transportation service request. Method 400 may be implemented by server 102 and/or terminal device 110, each including at least one processor. In the description below, server 102 is used as an example for implementing method 400. It is contemplated that method 400 can also be implemented by terminal device 110, or jointly by server 102 and terminal device 110.

Step 402 is similar to step 302 described above and descriptions will not be repeated. In step 404, server 102 may cause terminal device 110 to search for nearby wireless APs, and obtain the AP information. For example, the AP information may include a Wi-Fi list indicating each network identification, AP location, device information, the router it connects to, and signal strength.

In step 406, server 102 may determine whether any AP found in step 404 exists in a pick-up location recommendation model that is stored in storage/memory 108 or acquired from another device. In some embodiments, the pick-up location recommendation model may be a look-up table that contains the Wi-Fi list (e.g., APs and hotspots) and their paired pick-up locations. The pick-up location recommendation model may be constructed using historical transportation service requests and the pick-up locations actually used in those requests. The process for constructing the model will be described in more details in connection with FIGS. 6-8.

If no AP found in step 404 exists in the model, method 400 may proceed to step 408 where server 102 may determine that no pick-up location may be recommended. Otherwise, in step 410, server 102 may determine whether terminal device 110 is connected to any of those APs that exist in the recommendation model. If so, server 102 may identify the connected AP in step 412. Otherwise, server 102 may identify the AP with the strongest signal in step 414.

In step 416, server 102 may determine pick-up location 124 for the current transportation service request based on the recommendation model. For example, server 102 may look up the pick-up location paired with the AP identified in step 412 or 414. In step 418, the recommended pick-up location 124 may be provided to terminal device 110 to be presented to the passenger. In step 420, either server 102 or terminal device 110 may determine a driving navigation route for the vehicle and a pedestrian navigation route for the passenger. The navigation routes may be provided to vehicle 120 and terminal device 110 to be displayed on their displays, respectively. The routes can guide the driver of the vehicle and the passenger to pick-up location 124.

Figure 5:
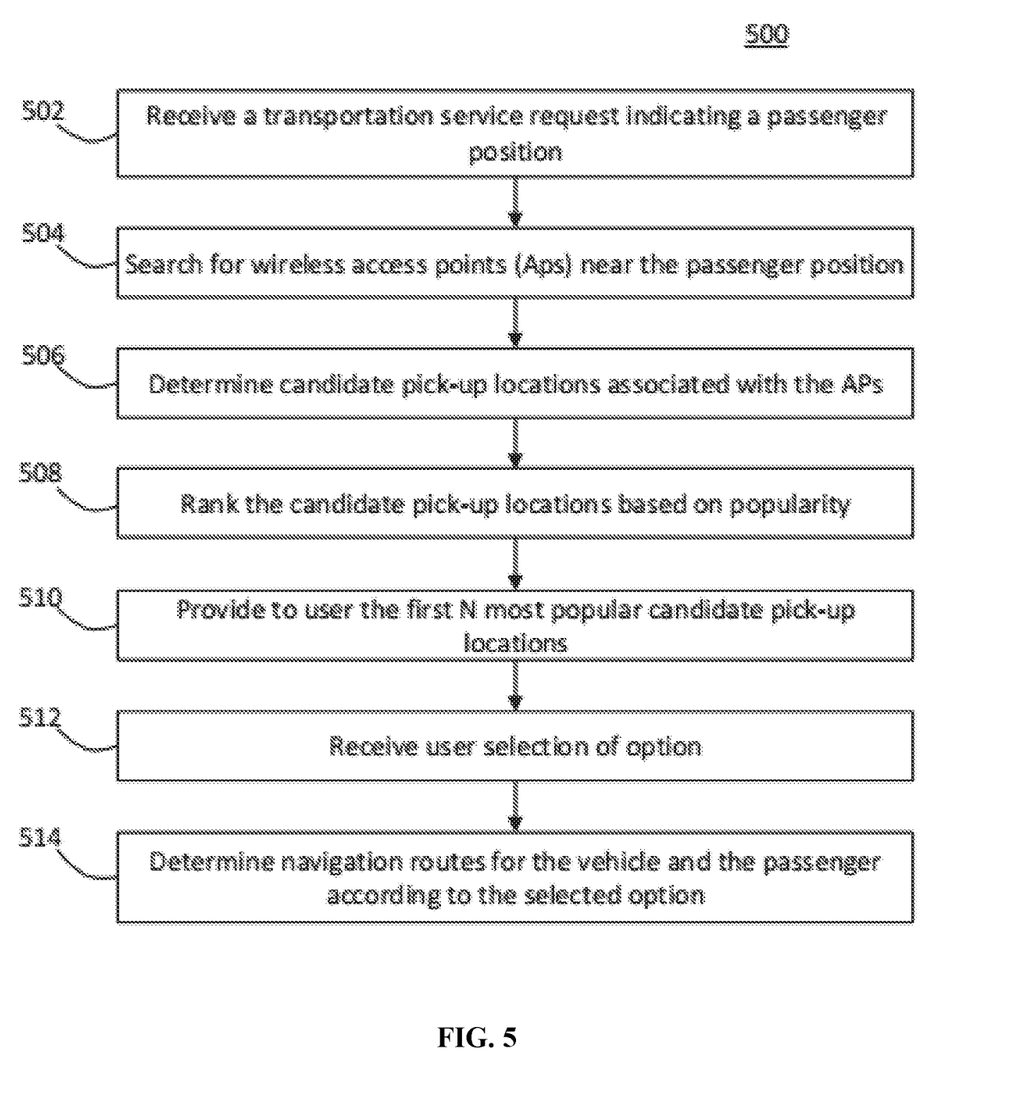
FIG. 5 illustrates a flowchart of another exemplary method for determining a pick-up location based on detected wireless APs, according to embodiments of the disclosure.

FIG. 5 illustrates a flowchart of another exemplary method 500 for determining a pick-up location based on detected wireless APs, according to embodiments of the disclosure. Like method 400, method 500 may also be performed when terminal device 110 is inside an architecture upon receiving the transportation service request. Method 500 may be implemented by server 102 and/or terminal device 110, each including at least one processor. In the description below, server 102 is used as an example for implementing method 500. It is contemplated that method 400 can also be implemented by terminal device 110, or jointly by server 102 and terminal device 110.

Steps 502-504 are similar to steps 402-404 described above and descriptions will not be repeated. In step 506, server 102 may determine candidate pick-up locations associated with the APs found in step 504. In some embodiments, server 102 may use the pick-up location recommendation model described above in connection with step 406, and will be described in more details in connection with FIGS. 6-8.

If no AP found in step 504 exists in the model, method 500 may conclude with no pick-up location recommended (not shown). Otherwise, in step 508, server 102 may rank the candidate pick-up locations based on popularity. In some embodiments, server 102 may consider the number of historical requests that used each pick-up location. For example, the number of historical request that use each candidate pick-up location may be calculated. In one example, if 15 historical requests used position X as the pick-up location, 10 used position Y as the pick-up location, and 5 used position Z as the pick-up location, the candidate pick-up locations may be ranked in the order of position X, position Y, and position Z.

In step 510, the first N most popular pick-up locations may be provided to terminal device 110. In some embodiments, N may be 1, i.e., the most popular candidate pick-up location becomes pick-up location 124 that will be provided to terminal device 110. The user may be asked to confirm she will accept the pick-up location. In some embodiments, N may be a number greater than 1, and accordingly, in step 510, multiple pick-up locations may be provided to terminal device 110 as options for the user to choose. In some embodiments, the pick-up locations may be presented to the user in the order consistent with the rank determined in step 508.

In step 512, the user may be asked to select one pick-up location among the options presented, and the selected pick-up location may be received by server 102. In step 514, either server 102 or terminal device 110 may determine a driving navigation route for the vehicle and a pedestrian navigation route for the passenger, similar to step 420.

Figure 6:
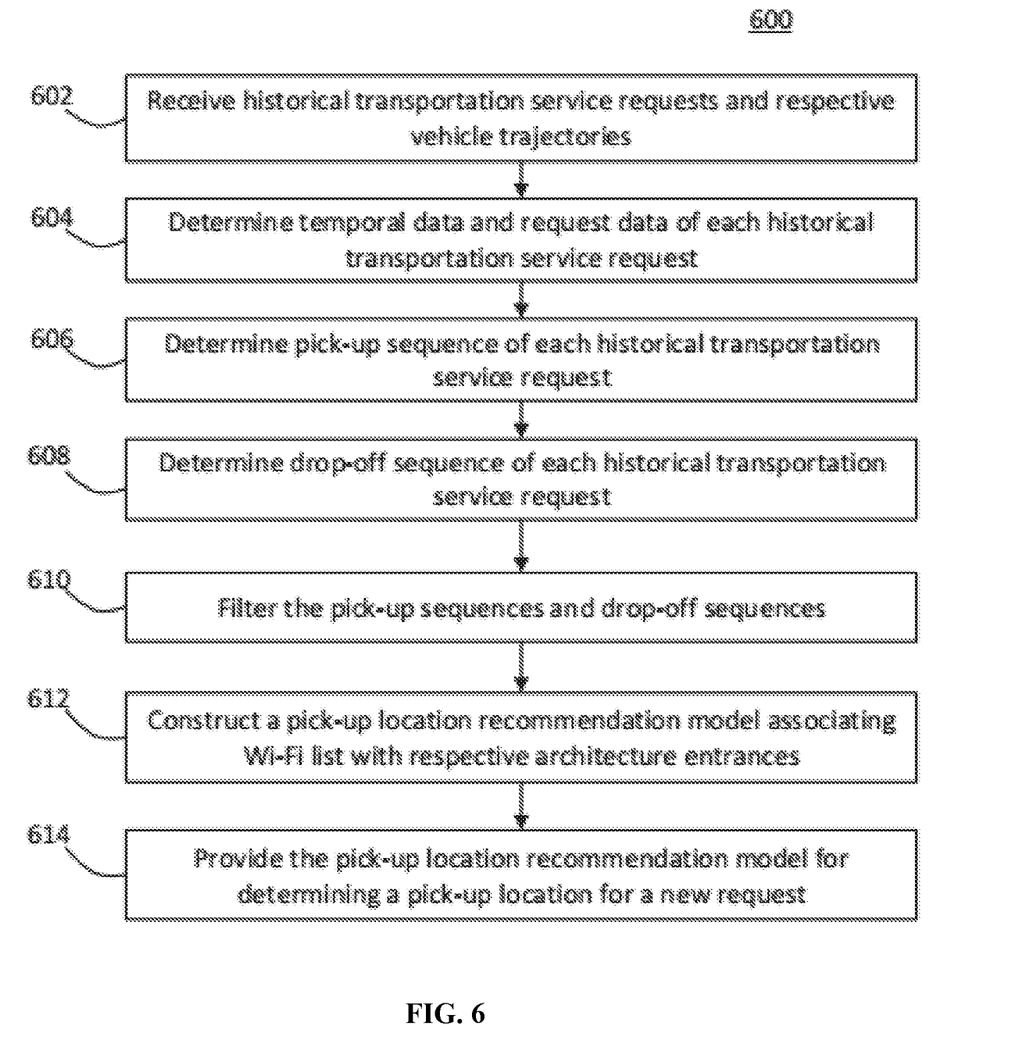
FIG. 6 illustrates an exemplary method for constructing a pick-up location recommendation model, according to embodiments of the disclosure.
Figure 7:
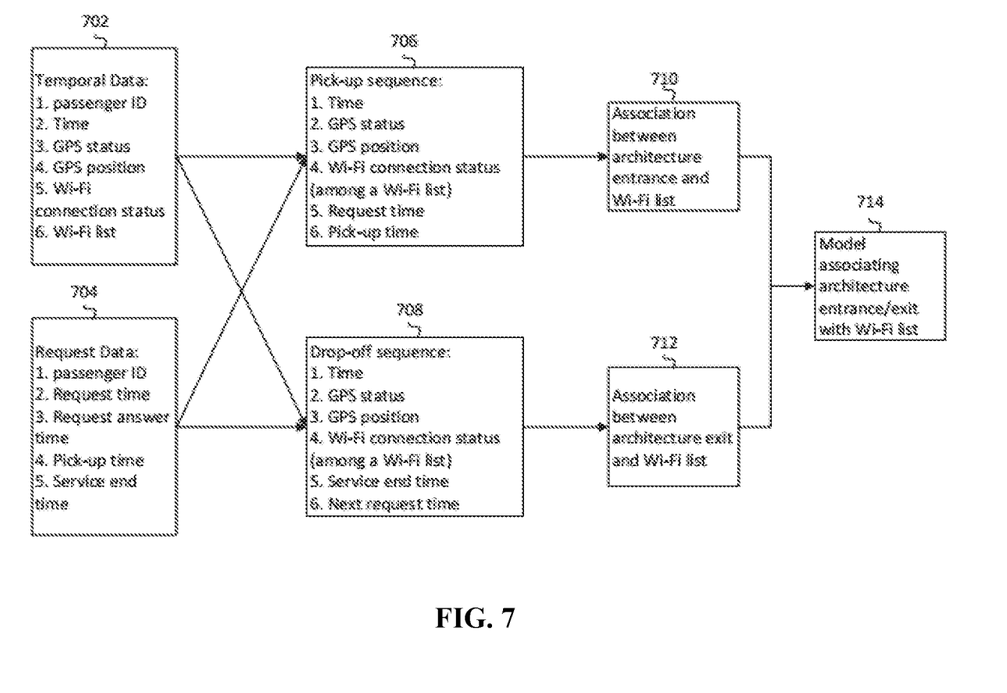
FIG. 7 illustrates a data flow for constructing a pick-up location recommendation model, according to embodiments of the disclosure.
Figure 8:
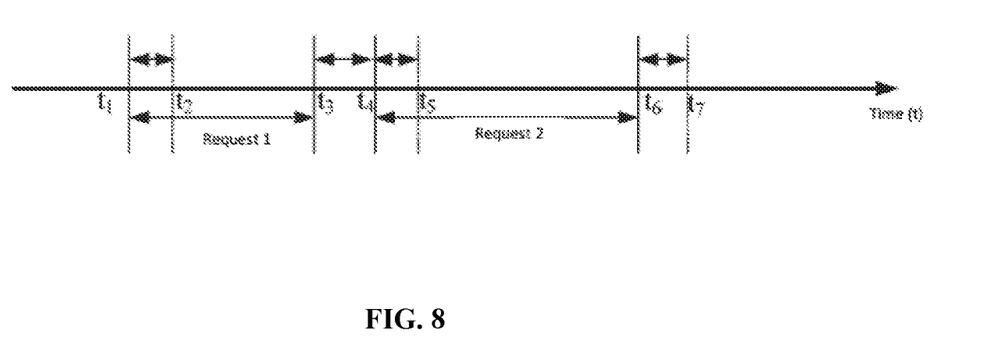
FIG. 8 illustrates an exemplary time sequence of a historical transportation service request, according to embodiments of the disclosure.

FIG. 6 illustrates an exemplary method 600 for constructing a pick-up location recommendation model, according to embodiments of the disclosure. Method 600 may be implemented by server 102 or a separate device before providing the transportation service. Method 600 may be repeated upon request or periodically to update the pick-up location recommendation model. FIG. 7 illustrates a data flow for constructing the pick-up location recommendation model, according to embodiments of the disclosure. FIG. 8 illustrates an exemplary time sequence of a historical transportation service request, according to embodiments of the disclosure. FIGS. 6-8 will be described together.

In step 602, server 102 may receive data profiles of a plurality of historical transportation service requests and their respective vehicle trajectories. In some embodiments, the historical transportation service requests may be obtained from a database remote from server 102. The historical transportation service requests may be received and fulfilled recently, such as within the last three months. The historical transportation service requests may be associated with multiple terminal devices including or not including terminal device 110. Each data profile may include various information associated with the historical transportation service request, such as the passenger ID, request time, pick-up location, pick-up time, trip route, trip length, drop-off time, drop-off location, and network condition information (e.g., a Wi-Fi list) obtained when the request was made, etc.

In step 604, server 102 may determine the temporal data and request data of each historical transportation service request. In some embodiments, as shown in FIG. 7, temporal data 702 may include, e.g., the passenger ID, a time sequence, a Wi-Fi list, and the GPS status, the GPS position, and the Wi-Fi connection status at each time point in the time sequence. Request data 704 may include, e.g., the passenger ID, the request time, the request answer time, the pick-up time, and the service end time.

In step 606, server 102 may determine a pick-up sequence of each historical request. In some embodiments, server 102 may set the time between the request time and the pick-up time as the pick-up time period and determine the pick-up sequence within the same. In some embodiments, as shown in FIG. 7, pick-up sequence 706 may include a time sequence (time points within the determined pick-up time period), and the GPS status, the GPS position, and the Wi-Fi connection status at each time point in the time sequence. The Wi-Fi connection status may include connections to Wi-Fis on a Wi-Fi list.

For example, as shown in FIG. 8, historical request 1 may have request time t1, pick-up time t2, and service end time t3. Historical request 2 may have request time t4, pick-up time t5, service end time t6, and t7 may be a threshold time (e.g., five minutes) after t6. Accordingly, the time period between t1 and t2 may be set as the pick-up time period for request 1 and the corresponding pick-up sequence may be Order_Start_Session 1. The time period between t4 and t5 may be set as the pick-up time period for request 2 and the corresponding pick-up sequence may be Order_Start_Session 2.

In step 608, server 102 may determine a drop-off sequence of each historical request. In some embodiments, server 102 may set the time between the service end time and the next request time as the drop-off time period and determine the drop-off sequence within the same. Alternatively, server 102 may set the drop-off time period as a threshold time (e.g., 30 seconds, or 1 minute) after the service end time. In some embodiments, as shown in FIG. 7, drop-off sequence 708 may include a time sequence (time points within the determined drop-off time period), and the GPS status, the GPS position, and the Wi-Fi connection status at each time point in the time sequence. The Wi-Fi connection status may include connections to Wi-Fis on a Wi-Fi list.

For example, as shown in FIG. 8, the time period between t3 and t4 may be set as the drop-off time period for request 1 and the corresponding drop-off sequence may be Order_Stop_Session 1. The time period between t6 and t7 may be set as the drop-off time period for request 2 and the corresponding drop-off sequence may be Order_Stop_Session 2.

In step 610, the pick-up sequences (determined in step 606) and drop-off sequences (determined in step 608) may be filtered using predetermined conditions. In some embodiments, a first condition used for filtering the pick-up sequences may include:
1) There exists at least one time point where a Wi-Fi list (e.g., APs or hotspots) is found and connectable with the terminal device (indicating that the passenger requested for the service when she was still indoor);
2) GPS is turned on at all times;
3) There exists an initial time period where GPS signal is not available (indicating that the passenger requested for the service when she was still indoor);
4) GPS becomes available after a threshold time (e.g., 20 seconds) after the request time (indicating the passenger was walking outside);
5) GPS signal is continuous after it becomes available;
6) There exists a time point where the GPS positioning precision is less than a threshold distance (e.g., 5 meters) (indicating the passenger passed the architecture exist);
7) The time period where the GPS positioning precision is less than a threshold distance is less than a threshold time length (e.g., 5 seconds).

In some embodiments, server 102 may identify the GPS position of the passenger corresponding to the time point where the GPS positioning precision becomes less than a threshold distance, and use that GPS position as the architecture exit. In some embodiments, the Wi-Fi APs or hotspots in the Wi-Fi list may be stored with the corresponding exit GPS position as an entry 710. In some embodiments, entry 710 may be saved as Order_Start_GPS_Wifi in the data format of (key=GPS position, value=[passenger_id, wifi_mac_1, wifi_mac_2, . . . ]). In some embodiments, the GPS position may be the latitude and longitude of the position multiplied by a large number (e.g., 50,000) and then be converted to the nearest integer.

In some embodiments, a second condition used for filtering the drop-off sequences may include:
1) There exists at least one time point where GPS signal is available to the terminal device (indicating that the passenger was dropped off outdoor);
2) GPS is turned on at all times;
3) Time points at which GPS signal is available;
4) GPS becomes unavailable after a certain time point (indicating the passenger passed an entrance to walk inside);
5) There exists a time point where a Wi-Fi list (e.g., APs or hotspots) is found and connectable with the terminal device (indicating that the passenger eventually went indoor);

In some embodiments, server 102 may identify the GPS position of the passenger corresponding to the last time point where the GPS was still available, and use that GPS position as the architecture entrance. In some embodiments, the Wi-Fi APs or hotspots in the Wi-Fi list may be stored with the corresponding entrance GPS position as an entry 712. In some embodiments, entry 710 may be saved as Order_Stop_GPS_Wifi in the data format of (key=GPS position, value=[passenger_id, wifi_mac_1, wifi_mac_2, . . . ]). In some embodiments, the GPS position may be the latitude and longitude of the position multiplied by a large number (e.g., 50,000) and then be converted to the nearest integer.

In step 612, server 102 may construct a pick-up location recommendation model 714 associating the Wi-Fi list with the corresponding candidate pick-up locations (e.g., the exit GPS positions and entrance GPS positions). In step 614, server 102 may provide recommendation model 714 for determining the pick-up location for a new request. For example, step 416 of method 400 or step 506 of method 500 may use recommendation model 714 to determine the pick-up location(s).

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:
1. A computer-implemented method for providing transportation service to a passenger associated with a transportation request, comprising:

receiving the transportation request from a terminal device, the transportation request indicating a passenger position;

causing the terminal device to search for network condition information associated with the passenger position;

determining, by at least one processor, a pick-up location for the passenger associated with the transportation request based on the network condition information; and providing the pick-up location to the terminal device, wherein determining the pick-up location for the passenger associated with the transportation request based on the network condition information further comprises:

identifying historical transportation requests matched with the network condition information, each historical transportation request being associated with a historical pick-up location;

determining a count of historical transportation requests that use each historical pick-up location;

ranking the historical pick-up locations according to the count; and determining the pick-up location for the passenger associated with the transportation request based on the historical pick-up locations.

2. The method of claim 1, further comprising:
providing a plurality of pick-up locations to the terminal device; and
receiving, from the terminal device, a selected pick-up location.

3. The method of claim 1, wherein the network condition information includes a network identification or a network signal strength.

4. The method of claim 1, wherein the transportation request further indicates a destination, wherein the method further includes:
identifying a historical transportation request matched with the destination; and
determining a historical pick-up location associated with the identified historical transportation request as the pick-up location for the passenger associated with the transportation request.

5. The method of claim 4, wherein a historical destination of the historical transportation request is in a same direction relative to the historical pick-up location as a direction of the destination relative to the passenger position.

6. The method of claim 1, wherein the network condition information includes a plurality of wireless access points within a proximity of the passenger position, wherein the method further comprises:
identifying a preferred access point among the plurality of wireless access points; and
determining the pick-up location associated with the preferred access point.

7. The method of claim 6, wherein the preferred access point is identified based on the terminal device being connected to the preferred access point or the preferred access point is associated with the strongest signal among the plurality of wireless access points.

8. The method of claim 6, further comprising:
determining that the preferred access point is located inside an architecture; and
determining an entrance of the architecture as the pick-up location.

9. The method of claim 1, wherein the network condition information includes a plurality of wireless access points within a proximity of the passenger position, wherein the method further comprises:
determining candidate pick-up locations associated with the plurality of wireless access points; and
identifying the pick-up location among the candidate pick-up locations.

10. The method of claim 9, wherein determining the pick-up location further comprises:
determining a count of historical uses of each candidate pick-up location;
ranking the candidate pick-up locations based on the count of historical uses; and
identifying the pick-up location according to the ranking.

11. The method of claim 1, wherein the pick-up location is determined using a pick-up location recommendation model constructed using historical transportation requests and their respective pick-up locations.

12. A system for providing transportation service to a passenger associated with a transportation request, comprising:
a communication interface configured to:
receive the transportation request from a terminal device, the transportation request indicating a passenger position; and
cause the terminal device to search for network condition information associated with the passenger position;
at least one memory; and
at least one processor coupled to the communication interface and the at least one memory, the at least one processor configured to:
determine a pick-up location for the passenger associated with the transportation request based on the network condition information; and
provide the pick-up location to the terminal device,
wherein to determine the pick-up location for the passenger associated with the transportation request based on the network condition information, the at least one processor is further configured to:
identify historical transportation requests matched with the network condition information, each historical transportation request being associated with a historical pick-up location;
determine a count of historical transportation requests that use each historical pick-up location;
rank the historical pick-up locations according to the count; and
determine the pick-up location for the passenger associated with the transportation request based on the historical pick-up locations.

13. The system of claim 12, wherein the network condition information includes a network identification or a network signal strength.

14. The system of claim 12, wherein the network condition information includes a plurality of wireless access points within a proximity of the passenger position, wherein the at least one processor is further configured to:
identify a preferred access point among the plurality of wireless access points based on the terminal device being connected to the preferred access point or the preferred access point being associated with the strongest signal among the plurality of wireless access points; and
determine a pick-up location associated with the preferred access point.

15. The system of claim 12, wherein the network condition information includes a plurality of wireless access points within a proximity of the passenger position, wherein the at least one processor is further configured to:
- determine candidate pick-up locations associated with the plurality of wireless access points;
- determine a count of historical uses of each candidate pick-up location;
- rank the candidate pick-up locations based on the count of historical uses; and
- identify the pick-up location according to the ranking.

16. The system of claim 12, wherein the pick-up location is determined using a pick-up location recommendation model constructed using historical transportation requests and their respective pick-up locations.

17. A non-transitory computer-readable medium that stores a set of instructions, which, when executed by at least one processor of an electronic device, cause the electronic device to perform a method for providing transportation service to a passenger associated with a transportation request, the method comprising:
- receiving the transportation request from a terminal device, the transportation request indicating a passenger position;
- causing the terminal device to search for network condition information associated with the passenger position;
- determining a pick-up location for the passenger associated with the transportation request based on the network condition information; and
- providing the pick-up location to the terminal device,
- wherein determining the pick-up location for the passenger associated with the transportation request based on the network condition information further comprises:
  - identifying historical transportation requests matched with the network condition information, each historical transportation request being associated with a historical pick-up location;
  - determining a count of historical transportation requests that use each historical pick-up location;
  - ranking the historical pick-up locations according to the count; and
  - determining the pick-up location for the passenger associated with the transportation request based on the historical pick-up locations.

* * * * *